Figure 1:
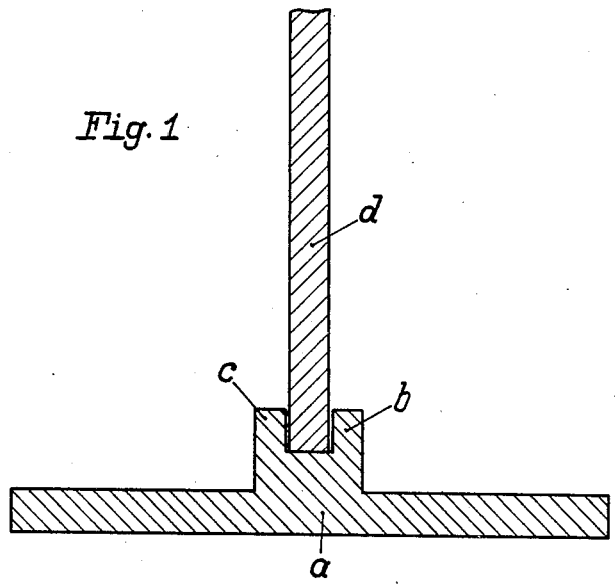

Patented Sept. 11, 1934

1,973,591

UNITED STATES PATENT OFFICE 1,973,591

METHOD FOR PRODUCING STRUCTURAL MEMBERS BY WELDING AND THE STRUCTURAL MEMBERS OBTAINED THEREBY

Karl Weber, Dortmund, Germany, assignor of one-half to the firms Vereinigte Stahlwerke Aktiengesellschaft, Dusseldorf, Germany, and Gesellschaft fur Elektroschweissung m. b. H., Dortmund, Germany Application July 11, 1931, Serial No. 550,246
In Germany October 18, 1930

4 Claims. (Cl. 29—148)

The present invention relates to a method for producing structural members and the structural members obtained thereby.

In uniting universal iron, profile iron and other structural elements by fusion welding it has previously been proposed to provide additional welding material, in the form of re-enforcements, at the places to be welded.

In uniting plate-like work-pieces having a groove or channel for the reception of a plate or strip, such as is the case for example in the manufacture of a T- or H-profile, there is the drawback that, on melting down the additional welding material which forms the edges or boundary of the channel, owing to the limited depth to which the welding penetrates, a gap remains between the projecting edges of the channel and the connecting part between them. The projecting edges of the channel must have an exactly determined height in order to prevent the workpiece provided with the channel being weakened by the welding process owing to a gap or furrow being welded in. On the other hand the welding of the projecting edges of the channel cannot proceed as far as the bottom of the channel, 1. Owing to the limited depth to which the welding penetrates,
2. Owing to the inefficiency of the welding, and
3. Owing to the danger of distortion of the parts to be united.

In order to avoid these drawbacks according to the invention substantially flat irons are united with one edge to the broad side of the plate-like elements which are provided with ribs enclosing channels between them the bottom of which is located above the general level of the said broad side, the junction being performed by melting down the ribs in a rounded form. The result is thereby obtained 1. That there is a sufficient distance between the welding flame and the surface of the plate,
2. The intermediate space between the projecting edges of the channel and the part which joins them is perfectly welded,
3. The moment of resistance at the place to be welded is increased and opposes distortion,
4. An increase in efficiency is obtained by making a higher welding speed possible.

This method of uniting the elements has the further advantage that it can be carried out both when welding with the carbon arc, with the autogenous welding flame, with the arc between metallic electrodes, with the atomic welding process as well as with a combination of the above methods, that is to say it can be carried out in a most universal manner with any known welding process.

The raising of the bottom of the channel will always possess the aforesaid advantages.

The invention is illustrated by way of example in cross-section in the accompanying drawing, in which Fig. 1 shows a cross section of two substantially flat irons which are to be joined by welding.

Figure 2:
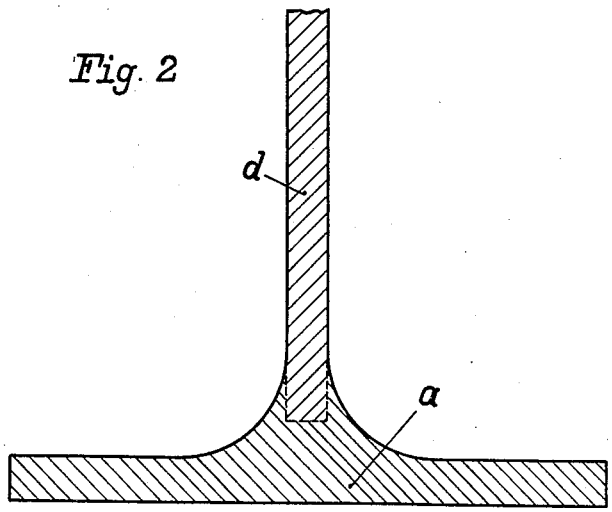

Fig. 2 shows a cross section of the final structural member after the weld junction.

In Fig. 1 the profile iron or plate like element $a$ is shown and is provided at its broad side with projections or ribs $b$ and $c$ enclosing a channel or groove between them the bottom of which is located above the general level of the broad side of the plate like element $a$.

In order to form a T-girder a flat iron or plate $d$ is inserted in the channel of the element $a$ the ribs of which guide laterally the plate $d$. Thereafter the ribs $b$ and $c$ are melted down in a rounded off form so as to provide curved flanks for the plate $d$.

The final structural member having a T-shape obtained in this manner is shown in Fig. 2.

It is obvious that also H-girders may be constructed in a quite similar manner and with the same advantages as the T-girders.

What I claim and desire to secure by Letters Patent of the United States is:

1. Method for the weld junction of substantially flat irons with one edge vertical to the broad side of plate like elements which are provided with ribs adapted for laterally guiding the said flat irons and with channels between the said ribs for receiving the said flat irons, the bottom of the channels being located above the general level of the said broad side, consisting in melting down the said ribs in a rounded form to effect the weld junction.

2. Method of manufacturing structural members such as T- or H-girders, by welding substantially flat irons with one edge vertically to the broad side of plate like elements which are provided with ribs adapted for laterally guiding the said flat irons and with channels between the said ribs for receiving the said flat irons, the bottom of the channels being located above the general level of the said broad side, the weld junction being performed by melting down the said ribs in a rounded form.

3. As an article of manufacture, a structural member such as a T- or H-girder, consisting of substantially flat irons one of which is provided with a groove in one of its broad sides for receiving the edge of the other, the bottom of the groove being above the level of the remaining portion of the said broad side, the said edge being welded to the said groove, and flanks enclosing the edge and passing into the said broad side in a rounded off form and having a weld structure.

4. As an article of manufacture, a structural member such as a T- or H-girder comprising at least two plate-like members, one of which is provided on one of its broad sides with spaced ribs leaving a channel, the bottom of which is above the level of the remaining portion of the broad side, the edge of the other member being arranged within the channel between the ribs, and the ribs being welded to the sides of the last mentioned member so as to provide curved flanks.

KARL WEBER.